(12) United States Patent
Casassa Mont et al.

(10) Patent No.: US 10,325,092 B2
(45) Date of Patent: Jun. 18, 2019

(54) DYNAMICALLY ADJUSTING A MODEL FOR A SECURITY OPERATIONS CENTER

(71) Applicant: HEWLETT PACKARD ENTERPRISE DEVELOPMENT LP, Houston, TX (US)

(72) Inventors: Marco Casassa Mont, Bristol (GB); Simon Ian Arnell, Bracknell (GB); Mihaela Gittler, Grenoble (FR)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 200 days.

(21) Appl. No.: 15/500,909

(22) PCT Filed: Mar. 11, 2015

(86) PCT No.: PCT/US2015/019968
§ 371 (c)(1),
(2) Date: Jan. 31, 2017

(87) PCT Pub. No.: WO2016/076909
PCT Pub. Date: May 19, 2016

(65) Prior Publication Data
US 2017/0228537 A1    Aug. 10, 2017

(30) Foreign Application Priority Data

Nov. 14, 2014   (EP) .................................. 14306814

(51) Int. Cl.
*G06F 21/00* (2013.01)
*G06F 21/55* (2013.01)
(Continued)

(52) U.S. Cl.
CPC ........ *G06F 21/552* (2013.01); *G06F 21/6218* (2013.01); *H04L 63/1433* (2013.01)

(58) Field of Classification Search
CPC . G06F 21/552; G06F 21/6218; H04L 63/1433
See application file for complete search history.

(56) References Cited

U.S. PATENT DOCUMENTS 8,214,905 B1 *   7/2012   Doukhvalov ......... G06F 21/577
                                                              726/24
8,417,814 B1    4/2013   Hartmann
(Continued)

FOREIGN PATENT DOCUMENTS

| EP | 2378427 A1 | 10/2011 |
| JP | 2013175085 A | 9/2013 |
| WO | WO-2013149339 A1 | 10/2013 |

OTHER PUBLICATIONS

Afsaneh Madani et al., "Log Management Comprehensive Architecture in Security Operation Center (SOC)," Oct. 2011, pp. 284-289, IEEE.
(Continued)

*Primary Examiner* — Sarah Su
(74) *Attorney, Agent, or Firm* — Hewlett Packard Enterprise Patent Department (57) ABSTRACT

Examples relate to dynamically adjusting a model for a security operations center ("SOC"). As such, the examples disclosed herein enable constructing a customer storage model over a set of time periods for a customer based on a set of resources of the SOC, a storage distribution model received from the customer related to expected usage of the set of resources, and a threat landscape for the customer. The customer storage model may be revised for a second time period based on actual storage use of the customer during a first time period, and a projection of an amount of data to be consumed in the second time period based on the threat landscape. Allocation of the resources in the SOC may be revised for the second time period based on the revision to the customer storage model.

15 Claims, 2 Drawing Sheets

400 CONSTRUCT A CUSTOMER STORAGE MODEL FOR A SOC OVER A SET OF PREDETERMINED TIME PERIODS

410 REVISE THE CUSTOMER STORAGE MODEL

420 REVISE ALLOCATION OF THE SET OF RESOURCES OF THE SOC BASED ON THE REVISED CUSTOMER STORAGE MODEL (51) Int. Cl.
*G06F 21/62* (2013.01)
*H04L 29/06* (2006.01)

(56) References Cited

U.S. PATENT DOCUMENTS

| | | | |
|---|---|---|---|
| 9,426,169 B2* | 8/2016 | Zandani | H04L 63/1433 |
| 2004/0243692 A1 | 12/2004 | Arnold et al. | |
| 2006/0010101 A1 | 1/2006 | Suzuki et al. | |
| 2008/0195447 A1 | 8/2008 | Bouillet et al. | |
| 2011/0173109 A1* | 7/2011 | Synesiou | G06Q 10/00 |
| | | | 705/34 |
| 2011/0283277 A1 | 11/2011 | Castillo et al. | |
| 2012/0131594 A1 | 5/2012 | Morgan | |
| 2012/0198447 A1 | 8/2012 | Osogami et al. | |
| 2013/0024236 A1 | 1/2013 | Byatt | |
| 2013/0268674 A1 | 10/2013 | Bailey et al. | |
| 2014/0289735 A1 | 9/2014 | Togawa | |
| 2014/0379411 A1* | 12/2014 | Earle | G06Q 10/06315 |
| | | | 705/7.25 |
| 2015/0172321 A1* | 6/2015 | Kirti | H04L 63/20 |
| | | | 726/1 |
| 2015/0199668 A1* | 7/2015 | Fernando | G06Q 20/203 |
| | | | 705/14.65 |
| 2015/0286982 A1* | 10/2015 | Dwyer | G06Q 10/063118 |
| | | | 705/7.17 |

OTHER PUBLICATIONS

Brad Hale, "Estimating Log Generation for Security Information Event and Log Management," May 7, 2012, pp. 1-6, Solan,vinds Wnitepaper, Available at: <content.solarwinds.com/creative/pdf/Whitepapers/estimating log generation white paper.pdf>.

Extended European Search Report, EP Application No. 14306814.6, dated Apr. 28, 2015, pp. 1-4, EPO.

International Search Report and Written Opinion, International Application No. PCT/US2015/019968, dated Jul. 29, 2015, pp. 1-9, KIPO.

J. Michael Butler, "Benchmarking Security information Event Management (SIEM)," Feb. 2009, pp. 1-14, A SANS Whitepaper, NitroSecurity.

* cited by examiner

DYNAMICALLY ADJUSTING A MODEL FOR A SECURITY OPERATIONS CENTER

BACKGROUND

Enterprise systems and other customers log security and other related information on data traveling on their data networks for security and analysis purposes. As the size of logged data may be extensive, an enterprise customer may use a security operations center to store and analyze its logged data. A security operations center may provide storage and analysis functionality for multiple customers.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead the proper scope of the disclosed examples may be defined by the appended claims.

A security operations center ("SOC") may compose a set of computing devices, storage devices, and/or other devices that provide managed and leveled security services to customers. A customer may comprise for example, an enterprise system and/or other type of customer.

To provide these services, an SOC may need to manage large amounts of data received from its customers. The management of data includes, for example, storing the collected/received data from customers, projecting future storage requirements based on contracts with customer provisioning for additional customers, provisioning for additional storage for an existing customer, balancing how storage is allocated among the customers using the SOC, and/or other data management functionality.

As vast amounts of data are continually stored in the SOC for a customer (e.g., log data and/or other security data of a customer), a system of the SOC faces a technical challenge in determining how much of its resources of the SOC to allocate to each customer. With storage resources being quite costly, a SOC system may not want to over provision its resources for an individual customer. At the same time, a SOC system may also not want to repeatedly have to provision additional resources to a customer as this unexpected provisioning may be costly and may affect performance for that customer and for other customers of the SOC.

This technical challenge may be exacerbated by the real-time processing that may be performed by the SOC. For example, in order to identify security issues, the SOC may perform real-time processing as well as historical/near-time processing. For the real-time processing, the SOC may have to determine which data to process and which to disregard whereas, for historical/near-time processing, the more data that is collected and stored, the more security insights may be determined. As such, a prediction of an amount of resources of an SOC to allocate to each customer may also need to consider the balance between real-time processing and historical/near-time processing for each customer.

To that end, a system for a SOC may attempt to dynamically predict, for each customer, an amount of storage needed to manage the data for that customer. The system may construct a dynamic customer storage model for each customer that may be used to predict storage needs for the customer. The system may comprise a simulation engine that secure the dynamic customer storage model to predict the storage needs for the customer.

In some examples, the customer storage model may comprise information related to information to be stored for the customer for a set of predetermined time periods. For example, for each time period of the set of predetermined time periods, the customer storage model may comprise information related to an amount of storage needed for the customer during that time period, a set of resources that may be used to store the needed amount of storage during that time period, specific types of storage that may be needed for the customer during that time period, and/or other information related to storage of data for the customer during that time period.

In some examples, the customer storage model may comprise (in addition to or separate from the information described above) a description of events stored by the customer, customer components, measurements, and/or other information related to storage of data for the customer. The description of events may comprise, for example, information related to the type of data being received from the customer (e.g., DNS data, https data, and/or other types of data). The customer components may comprise, for example, a subset of system resources used by the customer, customer devices from which data may be received (e.g., loggers), a threat landscape for the customer and/or other components. The measurements may comprise measurements similar to those described above with respect to estimated data to be received from the customer. In some examples, the measurements may comprise for each predetermined time period, information related to an amount of data being received, an amount of storage being consumed for the received data, a projection of an amount of data that may be used based on the threat landscape, and/or other measurements.

In some examples, the customer storage model may also comprise information related to whether real-time processing, historical/near-time processing of a combination thereof, is performed for the customer. In some examples, the customer storage model may comprise a first customer storage model that may be issued to predict storage needs for real-time processing for the customer and a second storage model that may be used to preset storage needs for historical/ near-time processing. In some examples, the customer storage model may be able to model performing real-time processing for a first time period and historical/near-time processing for a second time period. The customer storage model may determine which type of processing should be performed based on the type of data, customer component from which data is received, and/or other characteristics of the data being processed. The customer storage model may access the characteristics based on which a type of processing is performed from the customer storage policy of the customer, a non-transitory storage medium of the SOC and/or from another source.

As discussed further detail below, the system of the SOC may use toe customer storage model, as well as information related to the resources of the SOC used for storing data from the customer, the storage capabilities may still be available in the SOC for use by the customer, a retention policy of the customer, the customer storage policy of the customer, and/or other information to determine whether to allocate additional resources for the customer. For example, a simulation engine of the system of the SOC may execute the customer storage model, with some or all of the additional other information as input, to determine whether to allocate additional resources for the customer. In some examples, the SOC system may output an amount of storage allocated for the customer, a predicted amount of storage needed for the next predetermined time period, imminent policy triggers based on the customer storage policy of the customer and/or other information relevant to storing data for the customer.

The SOC system may initially construct the customer storage model based on information from a customer storage policy of the customer, and may periodically and dynamically revise the customer storage model based on a variety of factors. The SOC system may predict an amount of storage needed by a customer at a next time period based on the revised model. For example a simulation engine of the SOC may execute the revised model to predict the amount of storage needed by the customer at the next time period and the system of the SOC may cause a change in allocation of resources to the customer based on the prediction.

In some examples, the system may receive a customer storage policy from the customer (and/or may construct a customer storage policy based on information received from the customer). The customer storage policy may comprise information received from a customer regarding the customers estimation of storage needs. For example, the SOC may receive a storage distribution model from the customer as part of the customer storage policy. The distribution model may comprise information related to estimated storage needs of the customer, including, for example, an average amount of estimated storage, a maximum amount of estimated storage, a minimum amount of estimated storage, and/or other measurements of storage. In some examples, the customer storage policy may comprise, for each of a set of predetermined time periods, an average amount of estimated storage, maximum amount of estimated storage, minimum amount of estimated storage, and/or other measurements of estimated storage. In some examples, the customer storage policy may also comprise similar information related to throughput of data from the customer.

The customer storage policy may also comprise information related to policy triggers. The policy triggers may comprise, for example, information related to exceeding a set of storage thresholds, a maximum estimate storage for the customer, a set of throughput thresholds, a maximum estimated throughput for the customer, corresponding consequences for each policy trigger and/or other information related to policing the storage usage of the customer. For example, the consequences may comprise providing additional provisioning of resources for a first predetermined number of times that the policy trigger occurs, providing an alert to the customer regarding the policy trigger, a monetary penalty after a predetermined number of times that the policy trigger occurs, a lock out of the customer from storing additional data at the SOC after a predetermined number of times that the policy trigger occurs, any combination thereof, and/or other consequences.

The customer storage policy may also comprise information related to a retention policy of the customer. The retention policy may comprise information related to how long data of the customer may be stored before it is deleted, archived, and/or otherwise removed from the SOC. The retention policy may be customized based on type of data, source (e.g., customer component) of data, and/or other characteristics of the data being stored. For example, for data coming from a particular customer component, a retention time may differ then from data coming from a second customer component. In some examples, the retention policy may comprise a first retention policy for real-time processing of data and a second retention policy for historical/near-time processing of data. Both retention policies may be used as the SOC may switch between real-time processing and historical/near-time processing for a customer.

In some examples, the customer storage policy may also comprise information indicating whether the customer storage policy is static or dynamic. For example, if the customer storage policy is dynamic, then the system may automatically increase allocation of resources to the customer based on a predicted amount of storage needed by the customer. In some examples, the customer storage policy may also comprise information related to whether the customer requires secluded storage. For example, responsive to a customer storage policy indicating some or all of the data from the customer requires secluded storage, the SOC may allocate resources to the customer for the corresponding data that may not be shared by other customers.

The customer storage policy may also comprise other information related to the storage of data for a customer, and may be customized for each individual customer.

The SOC system may initially construct the customer storage model based on information from a customer storage policy of the customer. For example, the SOC system may construct the initial customer storage model based on the measurements of estimated storage and estimated throughput in the customer storage policy. The SOC system may construct this initial model also based on the available resources at the SOC. For example, the SOC system may select a set of resources for the customer based on information related to the resources and the customer storage policy. The information related to a resource may include, for example maximum storage capacity, maximum throughput, compression ratio parameter, and/or other information related to storage ability of the resource. In some examples, the SOC may construct an initial customer storage model that load balances data storage from the customer across a subset of resources of the SOC based on the customer storage policy and the information related to the resources of the SOC.

The SOC system may also construct the customer storage model based on a threat landscape for the customer. A threat landscape for a customer may comprise information related to predicted security issues that a customer may face in the future, an estimated amount of data that may need to be stored in association with each predicted security issue, and/or other information related to data associated with a predicted security threat. The threat landscape may be customized for a customer. The SOC system may store the threat landscape for the customer. In some examples, the SOC system may access the threat landscape for the customer from a non-transitory storage medium of the SOC system.

The SOC system may also construct the customer storage model based on whether the SOC will be performing real-time processing or historical/near-time processing, based on whether secluded storage is required, based on whether the customer storage policy is dynamic, and/or based on other information related to storing data for the customer.

The SOC system may periodically and dynamically revise the customer storage model based on a variety of factors. For example, the SOC system may determine actual usage of the SOC by a customer at predetermined time periods and may revise the customer storage model at the predetermined time periods based on the determined actual usage. The SOC system may also revise the customer storage model based on a projection of an amount of data that the customer is estimated to use based on the threat landscape for the customer (e.g., based on a set of threats that are predicted to occur in the next time period). The SOC system may also revise the customer storage model based on the customer storage policy of the customer. For example, the SOC system may revise the customer storage model based on the retention policy of the customer, a switch to a different type of processing, and/or other information from the customer storage policy. In some examples, the SOC system may also revise the customer storage model for a customer based on changes to a customer storage model of another customer, allocation of resources of the SOC to another customer, and/or other changes in the SOC due to another customer. While revising the customer storage model, the SOC system may also consider the information related to the resources of the SOC as the SOC system determines whether to allocate additional storage to the customer.

The SOC system may execute the customer storage model on a simulation engine of the SOC system to predict an amount of storage needed by a customer at a next time period based on the revised customer storage model and may cause a change in allocation of resources to the customer based on the prediction.

Figure 1:
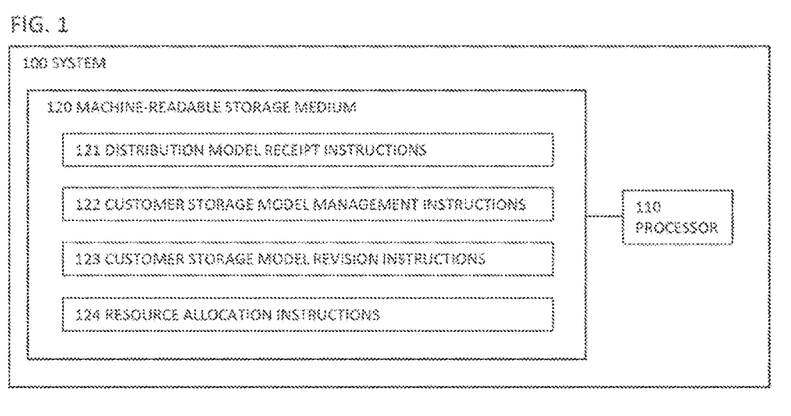
FIG. 1 is a block diagram of an example system for dynamically adjusting a model for a security operations center.

Referring now to the drawings, FIG. 1 is a block diagram of an example system 100 for dynamically adjusting a model for a security operations center ("SOC"). System 100 may be a cloud server, a mainframe, notebook, desktop, tablet, workstation, mobile device, or any other device suitable for executing the functionality described below. In some examples, system 100 may be part of a system of computing devices, such that each computing device in the system may comprise the functionality and/or structure of system 100. In some examples, the system 100 (and/or other computing devices in the system of computing devices) may be management servers that provide services, functionality, information, and/or other data to other devices in the system 100 as well as to customers of the system 100. In the embodiment of FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, 124, and/or other instructions to enable dynamically adjusting a model for a SOC, as described below. As an alternative or in addition to retrieving and executing instructions, processor 110 may include one or more electronic circuits comprising a number of electronic components for performing the functionality of one or more of instructions 121, 122, 123, 124, and/or other instructions.

In one example, the program instructions 121, 122, 123, 124, and/or other instructions can be part of an installation package that can be executed by processor 110 to implement the functionality described herein. In this case, memory 120 may be a portable medium such as a CD, DVD, or flesh drive or a memory maintained by a computing device from which the installation package can be downloaded and installed. In another example, the program instructions may be part of an application or applications already installed on system 100.

Machine-readable storage medium 120 may be any hardware storage device for maintaining data accessible to system 100. For example, machine-readable storage medium 120 may include one or more hard disk drives, solid state drives, tape drives and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine readable storage medium 120 may be encoded with executable instructions for dynamically adjusting a model for a security operations center. As detailed below, storage medium 120 may maintain and/or store the data and information described herein. Storage medium 120 may store for each customer of the SOC, a customer storage policy, a threat landscape, and/or other information related to the customer.

The system 100 may also compose a set of resources of the SOC that may be used to store data from customers of the SOC. In some examples, the storage medium 120 may also store information related to the resources. For example, for each resource, the storage medium 120 may store resource type, data capacity, current available capacity in the resource, customers that currently store data in the resource, whether the resource provides secluded storage for a customer, and/or other information related to the resource.

The system may also comprise a set of simulation engines that may be used to execute customer storage models of each of the customers of the SOC and predict an amount of resources to be allocated by the SOC. Further details about the simulation engines will be provided below.

Distribution model receipt instructions 121, when executed by processor 110 may receive from a customer, a storage distribution model As mentioned above, the storage distribution model may be used by the system 100 to construct an initial customer storage model. The storage distribution model may comprise, for example, information related to expected usage of a set of resources of the SOC over a set of predetermined time periods for the customer. The information related to expected usage of the set of resources may comprise an average amount of usage, a maximum amount of usage, and a minimum amount of usage of resources for each of the set of predetermined time periods. In some examples, the information related to expected usage of the set of resources may comprise information related to an expected amount of data to be stored in the set of resources for each of the set of predetermined time periods (e.g., a minimum, average maximum, and/or other measurements of data). The distribution model receipt instructions 121, when executed by processor 110, may store the received storage distribution model from the customer in the storage medium 120.

The distribution model receipt instructions 121, when executed by processor 110 may receive storage attribution models for each customer of the SOC. In some examples, the distribution model receipt instructions 121, when executed by processor 110, may receive the storage distribution models as part of a customer storage policy received from the customer. In some examples, the distribution model receipt instructions 121, when executed by processor 110, may receive the storage distribution model from a customer responsive to the customer registering to use services provided by the SOC.

In the examples described herein, the customer may communicate with the system 100 via a customer computing device (as described below in FIG. 3). As such, functionality and description pertaining to a customer's actions may be implemented by an associated customer computing device. As used herein, the term customer may comprise one or more computing devices, storage devices, and/or other electronic devices of an enterprise system that communicate with the system 100 of the SOC.

Customer storage model management instructions 122, when executed by processor 110 may manage a customer storage model over the set of predetermined time periods for the customer based on the set of resources of the SOC, the received storage distribution model, and a threat landscape for the customer. For example, the customer storage model management instructions 122, when executed by processor 110, may construct the customer storage model over the set of predetermined time periods for the customer based on the set of resources of the SOC, the received storage distribution model, a threat landscape for the customer, and/or other information related to storage of data for the customer. Customer storage model revision instructions 123, when executed by processor 110, may also revise the customer storage model for the next predetermined time period of the set of predetermined time period based on actual storage use of the customer, end a projection of data to be consumed the next predetermined time period based on the threat landscape.

The customer storage revision instructions 123, when executed by processor 110, may determine actual storage use of the customer at each predetermined time interval in various manners. In some examples, the customer storage revision instructions 123, when executed by processor 110, may use Monte-Carlo style simulation to determine actual usage and revise the customer storage model. In some examples, the customer storage revision instructions 123, when executed by processor 110, may track log activity of each application, device logger, and/or other component of a customer during the time period. For example, the customer storage revision instructions 123, when executed by processor 110, may spawn at each predetermined time period, a process that creates a log activity of each device, application, logger, and/or other component of the customer. In some examples, the process spawned by customer storage revision instructions 123, when executed by processor 110, may sample a number and size of events from the data being received from the customer, and may extrapolate, based on the sampled number and size of events a log activity of the customer. As such, the customer storage revision instructions 123, when executed by processor 110, may determine usage and throughput per component of the customer and/or for the customer as a whole.

The customer storage revision instructions 123, when executed by processor 110 may compare the amount of storage and/or throughput with information output from the execution of the as-yet unrevised customer storage model by the simulation engine of the system 100 to determine whether the model needs to be revised to better fit actual usage of the SOC by the customer.

In some examples, the customer storage revision instructions 123, when executed by processor 110, may compare the actual amount of storage and/or throughput used by the customer with the customer storage policy to determine whether the customer storage model should be revised. In some examples, the customer storage revision instructions 123, when executed by processor 110, may automatically revise the customer storage model to take into account the actual usage of storage (e.g., amount and throughput).

In some examples, the customer storage revision instructions 123, when executed by processor 110, may further revise the customer storage model based on a retention policy associated with the customer. For example, the customer storage revision instructions 123, when executed by processor 110, may reduce the determined actual amount of storage by an amount of data no longer being retained by the SOC in the predetermined time period. In some examples, the customer storage revision instructions 123, when executed by processor 110, may reduce an amount of the set of resources allocated to the customer based on the retention policy.

In some examples, the customer storage revision instructions 123, when executed by processor 110, may receive access, and/or otherwise obtain a new threat landscape for the customer. The customer storage revision instructions 123, when executed by processor 110, may revise the customer storage model based on the new threat landscape. For example, based on an amount of data projected to be logged based on the new threat landscape, the customer storage revision instructions 123, when executed by processor 110, may revise the customer storage model.

In some examples, the customer storage revision instructions 123, when executed by processor 110, may execute the customer storage model on the simulation engine of the system 100. The simulation engine of the system 100 may comprise an engine that takes as input one or more customer storage models and any other additional information related to storage of data in the SOC and provides a prediction of resources to be allocated in the SOC (as well as the other outputs described herein). The simulation engine may comprise structure and functionality similar to the engines described below with respect to FIG. 2.

In some examples, the customer storage revision instructions 123, when executed by processor 110, may execute the customer storage model on the simulation engine with differing inputs to determine an optimized manner in which to process data for the customer in the SOC. For example, the customer storage revision instructions 123, when executed by processor 110, may execute the customer storage model on the simulation engine while inputting an assumption that certain types of data are processed in real-time, while others are stored and processed to historical/near-time. The customer storage revision instructions 123, when executed by processor 110, may input different assumptions with different data being processed in real-time or historical/near-time and may compare the results of the execution of the model with different assumptions to determine an optimal allocation of resources for the customer based on different scenarios for the customer. The assumptions may be determined based on the customer storage policy, received from the customer, learned by the system 100 based on processing performed for the customer in the SOC, and/or otherwise determined. Other types of assumptions may be used as well, and the assumptions used are not limited to the examples described herein.

In some examples, the customer storage revision instructions 123, when executed by processor 110, may also determine, store, and/or otherwise manage information related to the customer storage model. For example, the customer storage revision instructions 123, when executed by processor 110 may determine usage and throughput of data per customer component and/or in total for the customer for the predetermined time period. The customer storage revision instructions 123, when executed by processor 110, may predict the information related to the customer storage model based on execution of the customer storage model by the simulation engine of the system 100.

The information related to the customer storage model (as determined by the customer storage revision instructions 123, when executed by processor 110) may comprise, for example, component allocation over time, customer usage over time, number of devices used per customer component, amount of storage usage per customer component, frequency of exceeding maximum storage capacity, frequency of exceeding other threshold capacity amounts (e.g., 80% capacity thresholds, 90% capacity thresholds, and/or other thresholds specified in the customer storage policy, information related to if or when throughput limits are reached, information related to if or when a customer has been locked out due to policy triggers in the customer storage policy, information relating to other policy triggers for the customer and/or other information related to the customer storage model.

In some examples, the customer storage revision instructions 123, when executed by processor 110, may receive scenario planning information from a customer and may provide a predictive customer storage model based on the received scenario planning information. As such, the customer storage revision instructions 123 when executed by processor 110, may allow for scenario planning optimization of impact to resource allocation for the customer (and among other customers of the SOC). Examples of scenario planning information may compose for example, changes in annual growth of data amounts being stored, variability of data amount for a customer with at least a predetermined amount of resources in the SOC, a change in the amount of available storage in the SOC, and/or other information related to scenario planning. For example, scenario planning information may be used as assumptions input with the customer storage model while the simulation engine executes the customer storage model.

The customer storage revision instructions 123, when executed by processor 110, may provide the information related to the customer storage model to the customer. For example, the customer storage revision instructions 123, when executed by processor 110, may provide the information to a local file system of the customer to an administrator of the customer, and/or may otherwise provide the information to the customer.

The customer storage revision instructions 123, when executed by processor 110, may revise customer storage models for multiple customers in parallel. For example, for each predetermined time period, the customer storage revision instructions 123, when executed by processor 110, may revise each customer storage model for each customer of the SOC. In some examples, the predetermined time period for a first customer may be different than a predetermined time period for a second customer, such that the customer storage revision instructions 123, when executed by processor 110, may revise the respective customer storage models for each customer at different times.

Resource allocation instructions 124, when executed by processor 110, may determine whether to revise allocation of the resources in the SOC at the next predetermined time period based on the revision to the customer storage model and the customer storage policy of the customer. For example, the resource allocation instructions 124, when executed by processor 110, may determine whether to revise the allocation of the resources in the SOC based on whether the customer storage model for the next predetermined time period exceeds allocated storage for the customer, based on whether any policy triggers in the customer storage model are met, and/or based on other comparisons to the information in the customer storage model for the customer. For example, the resource allocation instructions 124, when executed by processor 110, may cause the simulation engine to execute the customer storage model and additional information to determine information based on the customer storage model. In some examples, each of the determinations made by the resource allocation instructions 124, when executed by processor 110, may be the result of execution of the customer storage model by the simulation engine.

In some examples, the resource allocation instructions 124, when executed by processor 110, may predict, based on the actual storage use of the customer, the customer storage model, and the customer storage policy, a next time period at which an amount of storage needed by the customer increases beyond the maximum allocation of the set of resources allowed for the customer based on the customer stooge policy. In some examples, the resource allocation instructions 124, when executed by processor 110, may predict a nest time period at which a policy trigger may occur.

For example, the resource allocation instructions 124, when executed by processor 110, may determine whether an individual trigger of the set of policy triggers in the customer storage model of the customer may occur in the next predetermined time period. Responsive to determining that the individual trigger may occur, the resource allocation instructions 124, when executed by processor 110, may provide information to the customer about the potential occurrence of the individual trigger in the next predetermined time period.

In some examples, the resource allocation instructions 124, when executed by processor 110, may determine, based on whether the customer storage policy requires secluded storage for the customer, whether to increase the allocation of the resources of the SOC to the customer.

The resource allocation instructions 124, when executed by processor 110, may also consider the customer storage models of other customers and the sets of resources allocated to those customers in the determination of whether to allocate additional resources to the customer.

For example, the resource allocation instructions 124, when executed by processor 110, may load balance allocation of the resources of the SOC among the set of customers storing data in the SOC. In some examples, the resource allocation instructions 124, when executed by processor 110, may temporarily load balance allocation of the resources responsive to the customer exceeding allocated storage a maximum storage estimate and/or otherwise requiring the unexpected provisioning of additional resources for the customer. The resource allocation instructions 124, when executed by processor 110, may load balance allocation of the resources of the SOC by also considering the information related to the resources of the SOC. As mentioned above, information related to a resource may comprise total capacity of the resource, available capacity of the resource maximum throughput for the resource, compression ratio parameters for the resource, and/or other information related to data storage ability of the resource.

In another example, the resource allocation instructions 124, when executed by processor 110, may consider which customers require secluded data, which customers have dynamic customer storage policies, and/or other information related to the customer storage policies of each individual customer.

Figure 2:
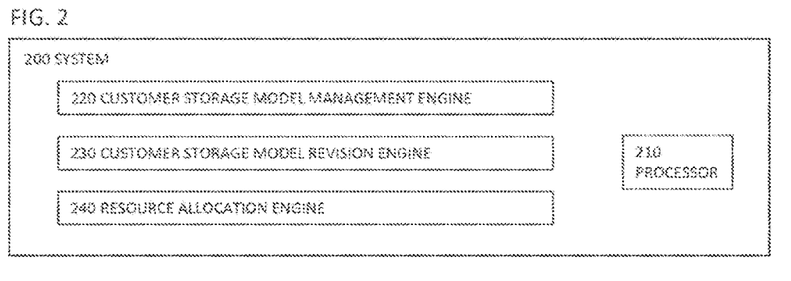
FIG. 2 is a block diagram of an example system for dynamically adjusting a model for a security operations center.

FIG. 2 is a block diagram of an example system 200 for dynamically adjusting a model for a security operations center. As with system 100, system 200 may be a cloud server, a mainframe, notebook, desktop, tablet, workstation, mobile device, or any other device suitable for executing the functionality described below. As with processor 110 of FIG. 1, processor 210 may be one or more CPUs, microprocessors, and/or other hardware devices suitable for retrieval and execution of instructions.

As detailed below, system 200 may include a series of engines 220-240 for dynamically adjusting a model for a security operations center. System 200 may also comprise a simulation engine similar to the simulation engine described above with respect to FIG. 1. The simulation engine of FIG. 2, similar to the simulation engine of FIG. 1, may execute one or more customer storage models while considering any additional information to predict allocation of the resources of the SOC and provide other information as detailed herein. Each of the engines may generally represent any combination of hardware and programming. For example, the programming for the engines may be processor executable instructions stored on a non-transitory machine-readable storage medium and the hardware for the engines may include at least one processor of the system 200 to execute those instructions in addition or as en alternative, each engine may include one or more hardware devices including electronic circuitry for implementing the functionality described below.

Customer storage model management engine 220 may manage, for each customer of the SOC, a corresponding customer storage model over a set of predetermined time periods for the customer based on a set of resources of the SOC, a corresponding storage distribution model provided by the customer related to expected usage of the set of resources, and a corresponding threat landscape for the customer. In some examples, the customer storage model management engine 220 may perform this functionality in a manner the same as or similar to that of the distribution model receipt instructions 121, customer storage model management instructions 122, and/or other instructions of system 100. Further details regarding an example implementation of customer storage management module engine 220 are provided above in connection with distribution model receipt instructions 121 customer storage model management instructions 122, and/or other instructions of FIG. 1.

Customer storage model revision engine 230 may revise, for each customer of the SOC, the corresponding customer storage model for a second predetermined time period of the set of predetermined time period based on corresponding actual storage use of the customer, and a corresponding projection of data to be consumed in the second predetermined time period based on the corresponding threat landscape of the customer. In some examples, the customer storage model revision engine 230 may perform this functionality in a manner the same as or similar to that of the customer storage model revision instructions 123 of system 100. Further details regarding an example implementation of customer storage model revision engine 230 are provided above so connection with customer storage model revision instructions 123 of FIG. 1.

Resource allocation engine 240 may revise allocation of the resources in the SOC at the second predetermined time period based on the revision to the first customer storage model. In some examples, the resource allocation engine 240 may perform this functionality in a manner the same as or similar to that of the system 100. Further details regarding an example implementation of resource allocation engine 240 are provided above in connection with resource allocation instructions 124 and/or other instructions of FIG. 1.

Figure 3:
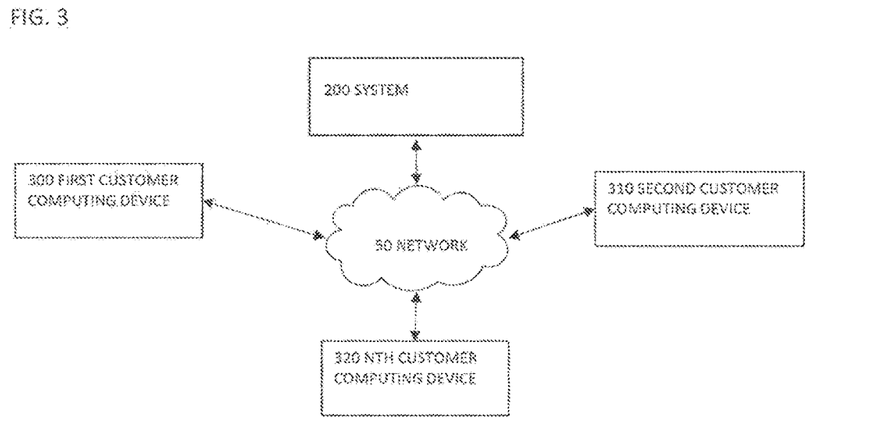
FIG. 3 is a block diagram of an example system for dynamically adjusting a model for a security operations center in communication with a plurality of computing devices.

FIG. 3 is a block diagram of an example computing device for dynamically adjusting a model for a security operations center, where the computing device is in communication with user computing devices over a network. In the example depicted in FIG. 3, the system 200 may communicate with first customer computing device 300 of a first enterprise system, second customer computing device 310 of a second enterprise system, and nth customer computing device 320 of a nth enterprise system, where each enterprise system and customer computing device may be communicably coupled to the system 100 via a network 50. While an individual customer computing device (e.g., customer computing device 300, 310, or 320 may be depicted as a single computing device, the individual computing device depicted in FIG. 3 may represent a set of customer components from which data is communicated to system 200. The network 50 may be any wired, wireless and/or other type of network via which the customer computing devices may communicate with the system 100.

Figure 4:
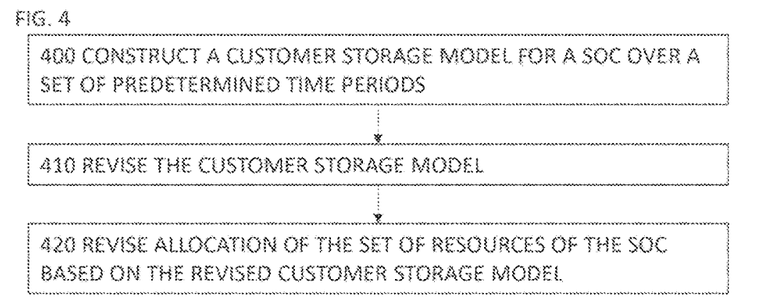
FIG. 4 is a flowchart of an example method for execution by a system for dynamically adjusting a model for a security operations center.

FIG. 4 is a flowchart of an example method for execution by a computing device for dynamically adjusting a model for a security operations center.

Although execution of the methods described below are with reference to system 100 of FIG. 1 and/or system 200 of FIGS. 2 and 3, other satiate devices for execution of this method will be apparent to those of skill in the art. The method described in FIG. 4 and other figures may be implemented in the form of executable instructions, stored on a machine-readable storage medium, such as storage medium 120, by one or more engines described herein, and/or in the form of electrons circuitry.

In an operation 400, a customer storage model over a set of predetermined time periods may be constructed for a customer based on a set of resources of the SOC, a storage distribution model received from the customer related to expected usage of the set of resources and a threat landscape for the customer. For example the system 100 (and/or the distribution model receipt instructions 121, the customer storage model management instructions 122, the customer storage model management engine 220, or other resource of the system 100) may construct the customer storage model. The system 100 may construct the customer storage model a manner similar or the same as that described above in relation to the execution of the distribution model receipt instructions 121, the customer storage model management instructions 122, the customer storage model management engine 220, and/or other resource of the system 100.

In an operation 410, the customer storage model may be revised for a second predetermined time period of the set of predetermined time periods based on actual storage use of the customer during a first time period of the set of predetermined time periods, and a projection of an amount of data to be consumed in the second predetermined time period based on the threat landscape. For example, the system 100 (and/or the customer storage model revision instructions 123, customer storage model revision engine 230, or other resource of the system 100) may revise the customer storage model. The system 100 may revise the customer storage model so a manner similar or the same as that described above in relation to the execution of the customer storage model revision instructions 123 customer storage model revision engine 230, or other resource of the system 100.

Figure 4A:
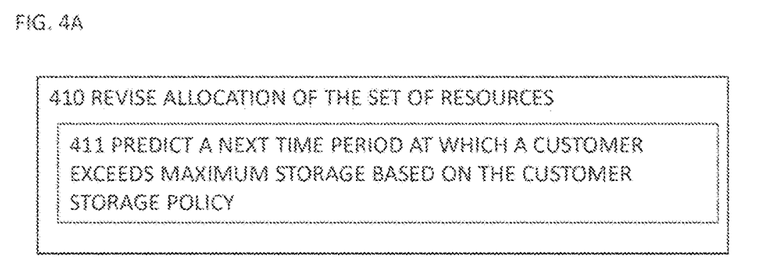
FIG. 4A is a flowchart of an example method for execution by a system for revising allocation of resources of a security operations center.

In some examples, the revision of the customer storage model may be performed in various manners. FIG. 4A is a flowchart of an example method for execution by a computing device for dynamically adjusting a model for a security operations center.

In an operation 411, a prediction may be made, based on the actual storage use of the customer, the customer storage model and the customer storage policy, of a next time period at which an amount of storage needed by the customer increases beyond the maximum allocation of the set of resources allowed for the customer based on the customer storage policy. For example, the system 100 (and/or the customer storage model revision instructions 123, the customer storage model revision engine 230, or other resource of the system 100) may make the prediction. The system 100 may make the prediction a manner similar or the same as that described above in reason to the execution of the customer storage model revision instructions 123, the customer storage model revision engine 230 and/or other resource of the system 100.

Returning to FIG. 4, in an operation 420, allocation of the resources in the SOC for the customer may be revised before the second predetermined time period based on the revision to the customer storage model. For example, the system 100 (and/or the resource allocation instructions 124, the resource allocation engine 240, or other resource of the system 100) may allocate the resources. The system 100 may allocate the resources in a manner similar or the same as that described above in relation to the execution of the resource allocation instructions 124, the resource allocation engine 240 or other resource of the system 100.

Figure 4B:
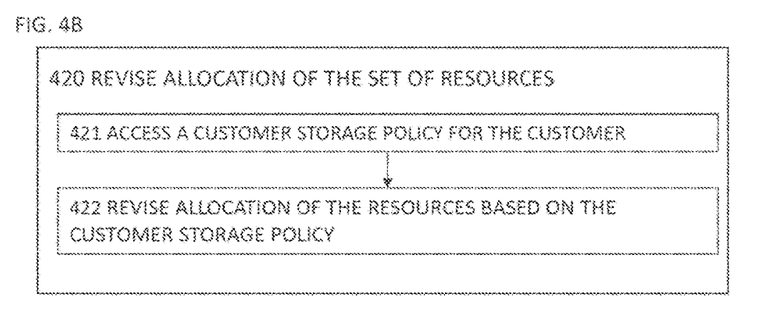
FIG. 4B is a flowchart of an example method for execution by a system for dynamically adjusting a model for a security operations center.

In some examples, the allocation of the resources may be performed in various manners. FIG. 4B is a flowchart of an example method for execution by a computing device for allocating the resources of the SOC.

In an operation 421, a first customer storage policy of the first customer may be accessed, wherein the first customer storage policy composes a first set of triggers, each trigger indicating that a change in allocation of the set of resources in the SOC is needed. For example, the system 100 (and/or the resource allocation instructions 124, the request allocation engine 230, or other resource of the system 100) may access the customer storage policy. The system 100 may access the customer storage policy in a manner similar or the same as that described above in relation to the execution of the resource allocations instructions 124, the request allocation engine 230, and/or other resource of the system 100.

In an operation 422, the allocation of the resources of the SOC at the second predetermined time period may be revised based on the first actual storage use of the first customer and the first customer storage policy. For example, the system 100 (and/or the resource allocation instructions 124, the request allocation engine 230, or other resource of the system 100) may revise the allocation. The system 100 may revise the allocation in a manner similar or the same as that described above in relation to the execution of the resource allocation instructions 124, the request allocation engine 230, and/or other resource of the system 100.

The foregoing disclosure describes a number of example embodiments for dynamically adjusting a model for a security operations center to use in communication with devices behind a firewall. The disclosed examples may include systems, devices, computer-readable storage media, and methods for dynamically adjusting a model for a security operations center. For purposes of explanation, certain examples are described with reference to the components illustrated in FIGS. 1-48. The functionality of the illustrated components may overlap, however, and may be present in a fewer or greater number of elements, and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-4B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A method for dynamically adjusting a model for a security operations center (SOC), the method being implemented in a computer system composing a physical processor, the method comprising:
    constructing a customer storage model over a set of time periods for a customer based on a set of resources of the SOC, a storage distribution model receiver from the customer related to expected usage of the set of resources, and a threat landscape for the customer;
    revising the customer storage model for a second time period of the set of time periods based on actual storage use of the customer during a first time period of the set of time periods, and a projection of an amount of data to be consumed in the second time period based on the threat landscape; and
    revising allocation of the resources in the SOC before the second time period based on the revision to the customer storage model.

2. The method of claim 1, wherein the storage distribution model received from the customer comprises information related to expected usage of the set of resources over the set of time periods for the customer, wherein the expected usage of the set of resources comprises an average amount of usage, a maximum amount of usage, and a minimum amount of usage for each of the set of time periods.

3. The method of claim 1, wherein the customer storage model is further revised based on a type of processing to be performed for the customer.

4. The method of claim 1, further composing:
    accessing a new threat landscape for the customer; and revising the customer storage model for a third time period based on the new threat landscape for the customer.

5. The method of claim 1, further comprising:
accessing a customer storage policy of the customer, wherein the customer storage policy comprises a set of policy triggers, each policy trigger indicating that a change in allocation of the set of resources in the SOC is needed; and
revising the allocation of the resources of the SOC at the second time period based on the actual storage use of the customer and the customer storage policy.

6. The method of claim 1, further comprising:
determining, based on the actual storage use of the customer, the customer storage model, and the customer storage policy, whether an individual policy trigger of the set of policy triggers may occur in a next threshold time period; and
responsive to determining that the individual policy trigger may occur in the next threshold time period, providing information to the customer indicating that the individual policy trigger may occur in the next threshold time period.

7. The method of claim 5, further comprising:
predicting, based on the actual storage use of the customer, the customer storage model, and the customer storage policy, a next time period at which an amount of storage needed by the customer increases beyond the maximum allocation of the set of resources allowed for the customer based on the customer storage policy.

8. A system for dynamically adjusting a model for a security operations center (SOC), system comprising:
a physical processor implementing machine readable instructions that cause the system to:
manage a first customer storage model over a set of time periods for a first customer based on a set of resources of the SOC, a first storage distribution model received from the first customer related to expected usage of the set of resources, and a first threat landscape for the first customer;
manage a second customer storage model over the set of time periods for a second customer based on the set of resources of the SOC, a second storage distribution model received from the second customer related to expected usage of the set of resources, and a second threat landscape for the second customer;
revise the first customer storage model for a second time period of the set of time periods based on first actual storage use of the first customer, and a first projection of data to be consumed in the second predetermined time period based on the first threat landscape; and
revise allocation of the resources in the SOC at the second time period based on the revision to the first customer storage model.

9. The system of claim 8, wherein the first storage distribution model received from the first customer comprises information related to expected usage of the set of resources over the set of time periods for the first customer, wherein the expected usage of the set of resources comprises an average amount of usage, a maximum amount of usage, and a minimum amount of usage for each of the set of time periods.

10. The system of claim 8, wherein the physical processor implements machine readable instructions that cause the system to:

access a first customer storage policy of the first customer, wherein the first customer storage policy comprises a first set of policy triggers, each policy trigger indicating that a change in allocation of the set of resources in the SOC is needed; and
revise the allocation of the resources of the SOC at the second time period based on the first actual storage use of the first customer and the first customer storage policy.

11. The system of claim 10, wherein the physical processor implements machine readable instructions that cause the system to:
determine, based on the first actual storage use of the first customer, the first customer storage model, and the first customer storage policy, a next time period at which an amount of storage needed by the first customer increases beyond the maximum allocation of the set of resources allowed for the first customer based on the customer storage policy; and
determine, based on whether the first customer storage policy allows dynamic increase of storage amount whether to increase the allocation of the resources of the SOC to the first customer.

12. The system of claim 11, wherein the physical processor implements machine readable instructions that cause the system to:
determine, based on whether the first customer storage policy requires secluded storage for the first customer, whether to increase the allocation of the resources of the SOC to the first customer.

13. The system of claim 8, wherein the physical processor implements machine readable instructions that cause the system to:
revise, in parallel to the revision of the first customer storage model, the second customer storage model for the second time period of the set of time period based on second actual storage use of the second customer, and a second projection of data to be consumed in the second time period based on the second threat landscape; and
revise allocation of the resources in the SOC at the second time period based on the revision to the second customer storage model.

14. A non-transitory machine-readable storage medium comprising instructions for dynamically adjusting a model for a security operations canter (SOC), the instructions executable by a processor of a computing device to:
receive, from a first customer, a first storage distribution model that comprises information related to expected usage of a set of resources of the SOC over a set of time periods for the customer, wherein the expected usage of the set of resources composes an average amount of usage, a maximum amount of usage and a minimum amount of usage for each of the set of time periods;
manage a first customer storage model over the sot of time periods for the first customer based on the set of resources of the SOC, the received first storage distribution model and a first threat landscape for the first customer;
revise the first customer storage model for a second predetermined time period of the set of time periods based on first actual storage use of the first customer, and a first projection of data to be consumed in the second predetermined time period based on the first threat landscape; and
determine whether to revise allocation of the resources in the SOC at the second time period based on the revision to the first customer storage model and a first customer storage policy of the first customer.

15. The machine-readable storage medium of claim 14, therein the instructions are executable by the processor to:
receive, from a second customer, a second storage distribution model that comprises information related to expected usage of the set of resources of the SOC over the set of time periods for the second customer, wherein the expected usage of the set of resources comprises an average amount of usage, a maximum amount of usage, and a minimum amount of usage for each of the set of time periods;
manage a second customer storage model over the set of time periods for the second customer based on the set of resources of the SOC, the received second storage distribution model and a second threat landscape for the second customer;
revise the second customer storage model for a second time period of the set of time periods based on second actual storage use of the second customer, and a second projection of data to be consumed in the second time period based on the second threat landscape; and
load balance allocation of the resources in the SOC among a set of customers storing data in the SOC, the set of customer comprising the first customer and the second customer.

* * * * *